(12) United States Patent
El-Kik

(10) Patent No.: US 9,377,996 B2
(45) Date of Patent: Jun. 28, 2016

(54) PARAMETERIZED DIGITAL DIVIDER

(75) Inventor: Tony S. El-Kik, Allentown, PA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 546 days.

(21) Appl. No.: 13/560,631

(22) Filed: Jul. 27, 2012

(65) Prior Publication Data

US 2014/0032622 A1 Jan. 30, 2014

(51) Int. Cl.
*G06F 7/535* (2006.01)

(52) U.S. Cl.
CPC .......... *G06F 7/535* (2013.01); *G06F 2207/5353* (2013.01)

(58) Field of Classification Search
None
See application file for complete search history.

(56) References Cited

U.S. PATENT DOCUMENTS

| | | |
|---|---|---|
| 3,956,621 A | 5/1976 | Booth |
| 4,364,115 A | 12/1982 | Asai |
| 4,724,529 A | 2/1988 | Irukulla et al. |
| 4,872,214 A | 10/1989 | Zurawski |
| 5,027,309 A | 6/1991 | Koumoto et al. |
| 5,335,253 A | 8/1994 | Oliver et al. |
| 5,524,091 A | 6/1996 | Billing |
| 5,907,499 A | 5/1999 | Suzuki |
| 5,999,962 A * | 12/1999 | Makino ........................ 708/654 |
| 6,317,771 B1 | 11/2001 | Langhammer |
| 6,578,062 B1 | 6/2003 | Gold et al. |
| 7,893,772 B1 | 2/2011 | Moyal et al. |
| 2008/0140744 A1 | 6/2008 | Shadich |
| 2011/0215842 A1 | 9/2011 | Jain et al. |

* cited by examiner

*Primary Examiner* — Michael D Yaary

(57) ABSTRACT

A method of performing digital division includes right-shifting a divider to provide a temporary divider, subtracting the temporary divider from a temporary dividend to provide a difference, determining the temporary dividend based on at least one of a dividend and the difference, and left-shifting a quotient based on the difference. A corresponding computer-readable medium and device are provided. A system to perform digital division includes a counter and a division circuit. The counter provides a count, and the division circuit is operatively coupled to the counter. The division circuit divides a dividend by a divider to provide a quotient in response to the counter. At least one of the counter and division circuit is configured to accept at least one of the count, dividend, divider, and quotient with a configurable bit-width.

25 Claims, 6 Drawing Sheets

PARAMETERIZED DIGITAL DIVIDER

BACKGROUND

Digital division (i.e., binary division) is a process whereby a binary number, referred to as a dividend, is divided by a second binary number, referred to as a divider. Digital division is increasingly required by modern applications such as, for example, timing generation, communications, digital multimedia, etc.

Conventional techniques for implementing digital division generally require substantial amounts of logic resources and related circuitry. In the case of a programmable logic device (PLD) implementation, large amounts of valuable programming resources are required to implement digital division, thereby limiting the size and/or precision of the data words that can be accommodated. Moreover, serpentine data paths required to connect the related logic circuitry within a particular integrated circuit can increase delay and result in slow performance, which is undesirable.

SUMMARY

In accordance with one embodiment of the invention, a method of performing digital division is provided, which includes right-shifting a divider to provide a temporary divider, determining a temporary dividend based on at least one of a dividend and a difference between the divider and the dividend, subtracting the temporary divider from the temporary dividend to provide a difference, and left-shifting a quotient based on the updated difference.

In accordance with another embodiments of the invention, a computer-readable medium is provided, which includes instructions that, when executed by a processing device, cause the processing device to perform a method of performing digital division. The method includes right-shifting a divider to provide a temporary divider, determining a temporary dividend based on at least one of a dividend and a difference between the divider and the dividend, subtracting the temporary divider from the temporary dividend to provide an updated difference, and left-shifting a quotient based on the updated difference.

In accordance with yet another embodiment of the invention a digital divider is provided, which includes a right-shift circuit, a subtraction circuit, a determination circuit, and a left-shift circuit. The right-shift circuit provides a temporary divider based on a divider, and the determination circuit provides a temporary dividend based on at least one of a dividend and a difference between the divider and the dividend. The subtraction circuit subtracts the temporary divider from the temporary dividend to provide an updated difference. The left-shift circuit provides a quotient based on the updated difference.

In accordance with still another embodiment of the invention, a system to perform digital division is provided, which includes a counter circuit and a division circuit. The counter provides a count, and the division circuit is operatively coupled to the counter. The division circuit divides a dividend by a divider to provide a quotient in response to the counter. At least one of the counter and division circuit is configured to accept at least one of the count, dividend, divider, and quotient with a configurable bit-width.

Embodiments of the invention will become apparent from the following detailed description, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that are useful in a commercially feasible embodiment are not shown in order to facilitate a less hindered view of the illustrated embodiments.

DETAILED DESCRIPTION

Embodiments of the invention relate generally to electronic devices and circuits and, more particularly, relate to methods, devices, and computer-readable media that provide for a parameterized digital divider with start and stop features, which is suitable for different design targets and/or applications. It should be understood, however, that embodiments of the invention are not limited to the particular illustrative methods and/or apparatus shown and described herein. Moreover, it will become apparent to those skilled in the art given the teachings herein that numerous modifications can be made to the embodiments shown that are within the scope of the claimed invention. That is, no limitations with respect to the embodiments shown and described herein are intended or should be inferred.

Embodiments of the digital divider are designed and can be synthesized using different technologies that eliminate the need for custom digital dividers. These embodiments are parameterizable or configurable for different input data widths, which enable cost and area requirements of the resulting digital divider to be readily managed and controlled. The embodiments disclosed herein also incorporate inputs that start and stop the division operation being performed.

Figure 1:
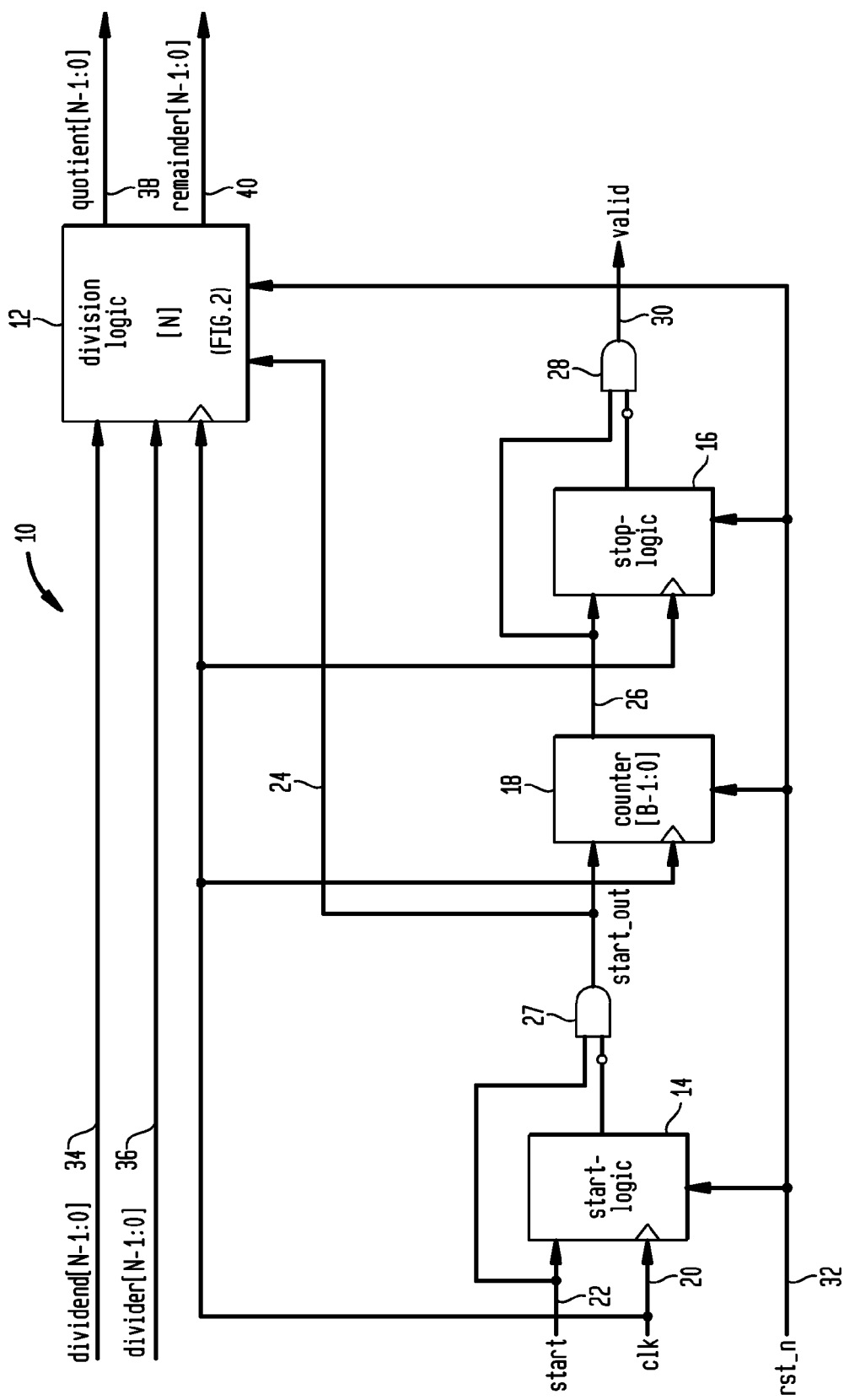
FIG. 1 is a block diagram depicting at least a portion of an exemplary parameterized digital divider, according to an embodiment of the invention.

FIG. 1 is a block diagram depicting at least a portion of an exemplary parameterized digital divider 10, according to an embodiment of the invention. The digital divider 10 includes division logic 12, start logic 14, stop logic 16, and a countdown binary counter 18. The stop logic 16 is controlled by the counter 18, which has a parameterizable, configurable, and/or programmable bit width count [B−1:0].

In the above description, the parameter B represents a width of the count in bits. The notation [B−1:0] is used herein to refer to bits B−1 to 0 of the count or counter. For example, if parameter B is equal to 5 then counter [B−1:0] refers to a counter having bits 4 to 0; similarly, count [B−1:0] refers to bits 4 to 0 of the count.

A clock signal 20 is coupled with the start logic 14, stop logic 16, counter 18, and division logic 12. A start trigger signal 22 is coupled with the start logic 14 and an input of an AND gate 27. An output of the start logic 14 is coupled with an inverted input of the AND gate 27. A start output signal 24 is output from the AND gate 27 and input to the counter 18 and division logic 12. The count [B−1:0] 26 is output from the counter 18 and input to the stop logic 16 and an AND gate 28. The output of the stop logic 16 is coupled with an inverted input of the AND gate 28, and the output of the AND gate 28 is a valid signal 30. A reset signal 32 is coupled with the start logic 14, stop logic 16, counter 18, and division logic 12.

Figure 2:
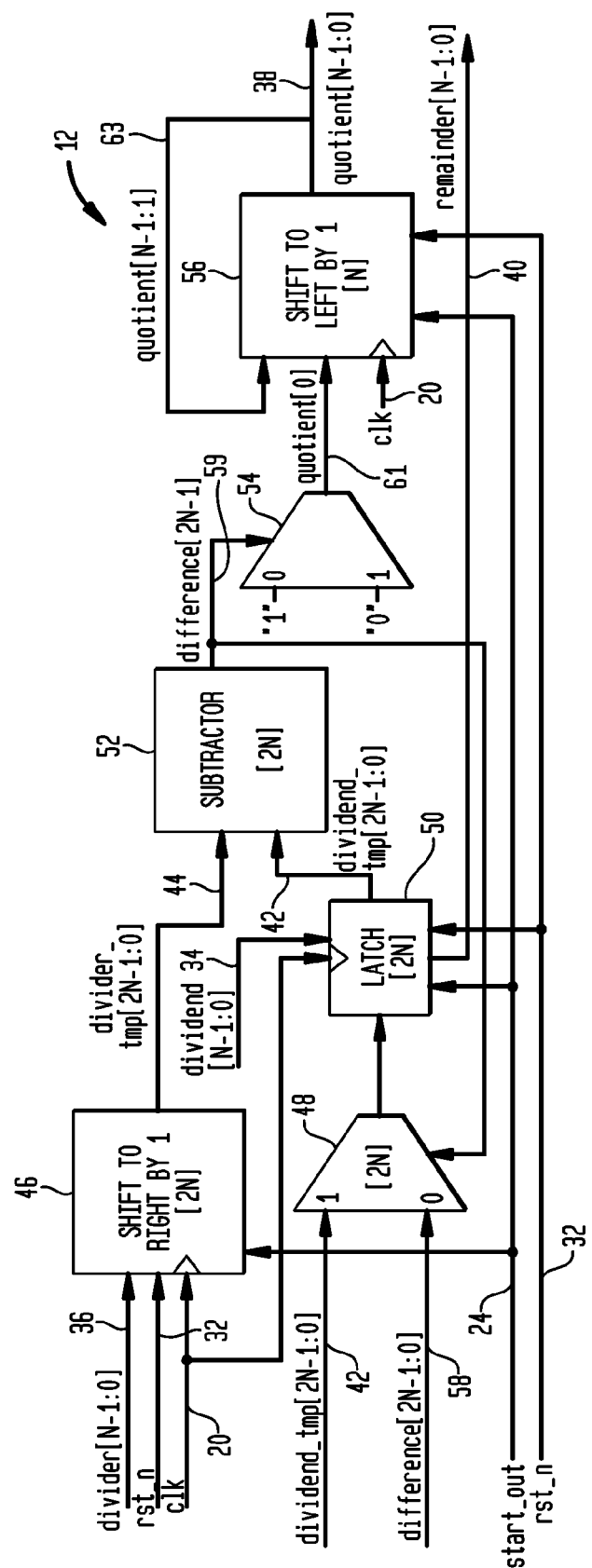
FIG. 2 is a block diagram depicting at least a portion of exemplary division logic incorporated in the digital divider shown in FIG. 1, according to an embodiment of the invention.

A dividend[N−1:0] 34 and divider[N−1:0] 36 are received as inputs by the division logic 12, and a quotient[N−1:0] 38 and remainder[N−1:0] 40 are output from the division logic 12. The parameter N represents a width of the dividend, divider, quotient, and remainder variables in bits. The notation [N−1:0] is used herein to refer to a range of bits from N−1 to 0 of the corresponding variable. For example, if parameter N is equal to 16 then dividend[N−1:0] refers to bits 15 to 0 of the dividend. Notation, such as [2N−1] and [0] with respect to, for example, difference[2N−1] and quotient[0] shown in FIG. 2, is used herein to refer to a single bit of the corresponding variable. For example, if parameter N is equal to 16, then difference[2N−1] refers to bit 31 or the most significant bit of the difference. Similarly, quotient[0] refers to bit 0 or the least significant bit of the quotient. Heavy-width lines, such as dividend[N−1:0] 34 in FIG. 1 and dividend_tmp[2N−1:0] 42 in FIG. 2, are used herein to refer to busses that include a plurality of bits of the corresponding variable, whereas standard-width lines, such as the lines associated with quotient[0] and difference[2N−1] shown in FIG. 2, are used herein to refer to single bits of the corresponding variable.

By way of example only, if the range of parameter B is 2-5 bits, then the range of parameter N is 2-16 bits since a 5-bit counter is able to count to 16 (or 10H). However, these ranges are programmable, and thus can be larger or smaller than these examples. Moreover, it is to be understood that embodiments of the invention are not limited to any specific numbers of bits for the parameters B or N. The width of the count is dependent on the width of the dividend. For example, if the dividend is 16 bits wide, then the counter is at least 5 bits wide in order to enable the counter 18 to count from 16 (or 10H) to 0 (or 00H). As another example, if the dividend is 8 bits wide, then the counter is 4 bits wide in order to enable the counter 18 to count from 8 (or 08H) to 0 (or 00H). That is, the minimum value of B is given by the value of $\log_2(N+1)$ rounded up to the nearest positive integer, where both B and N are positive integers.

The start logic 14 is controlled by an externally applied start trigger signal 22. When the start trigger signal 22 is set to 1 or high, the start logic 14 loads the counter 18 with parameter B. When the start output signal 24 is asserted, the division logic 12 is loaded with a copy of the dividend[N−1:0] 34 and divider[N−1:0] 36. This causes the division logic 12 to start the division operation using a digit-by-digit algorithm, as described below in reference to FIG. 2. While the counter 18 is counting down in response to the clock signal 20, the division operation is being performed. When the counter 18 counts down to a value of zero, the counter 18 terminates the division operation and the valid signal 30 is asserted. When the valid signal 30 is asserted, the quotient[N−1:0] 38 and remainder[N−1:0] 40 are valid at the output of the division logic 12 and ready to be used by external circuitry.

Thus, embodiments of the invention include the following features:
 a start feature;
 a stop feature, which is when the valid signal 30 is asserted to indicate the division operation is complete and the quotient 38 and remainder 40 are valid; and
 parameterizable or programmable bit widths, which enables the digital divider to be configured to handle different divider, dividend, quotient, remainder, and count widths.

FIG. 2 is a block diagram depicting at least a portion of exemplary division logic 12 incorporated in the digital divider 10 shown in FIG. 1, according to an embodiment of the invention. With reference to FIG. 2, the division logic 12 includes a right shifter 46, multiplexer 48, latch 50, subtractor 52, multiplexer 54, and left shifter 56. The divider[N−1:0] 36 is coupled with the right shifter 46, and the clock signal 20 is coupled with the right shifter 46, latch 50, and left shifter 56. The reset signal 32 and start output signal 24 are coupled with the right shifter 46, latch 50, and left shifter 56. A dividend_tmp[2N−1:0] 42 and difference[2N−1:0] 58, which represents the difference between a divider_tmp[2N−1:0] 44 and dividend_tmp[2N−1:0] 42, are coupled with the multiplexer 48, the output of which is coupled with the latch 50. The dividend[N−1:0] 34 is coupled with an input of the latch 50. An output of the latch 50, which is the dividend_tmp[2N−1:0] 42, and the divider_tmp[2N−1:0] 44 are coupled with the subtractor 52.

The most significant bit of the difference[2N−1:0] 58, which is the difference[2N−1] 59, is output from subtractor 52 and coupled with selector inputs of multiplexers 48, 54. The output of multiplexer 54, which represents a least significant bit of the quotient[N−1:0] 38 or quotient[0] 61, is coupled with the left shifter 56. The output of the latch 50 is the remainder[N−1:0] 40. Inputs of multiplexer 54 are coupled with power and ground. The output of the left shifter 56 is the quotient[N−1:0] 38, all but the least significant bit of which (quotient[N−1:1] 63), are fed back to an input of the left shifter 56. The output of the multiplexer 48 is provided to an input of the latch 50.

Values for dividend_tmp[2N−1:0] 42 and divider_tmp[2N−1:0] 44 are initialized or loaded via a register (not shown) in the digital logic 12 in response to power being provided to the division logic 12 during initialization of the division algorithm. The initial value of dividend_tmp[2N−1:0] 42 includes zeroes in the N most significant bits and dividend[N−1:0] 34 in the N least significant bits. The initial value of divider_tmp[2N−1:0] 44 includes a zero in the most significant bit, divider[N−1:0] 36 in the next N most significant bits, followed by zeroes in the remaining N−1 least significant bits.

If the most significant bit (MSB) of the difference between the dividend_tmp[2N−1:0] 42 and the divider_tmp[2N−1:0] 44 is equal to zero, then the least significant bit (LSB) of the quotient[N−1:0] 38 is set to one and the dividend_tmp[2N−1:0] 44 is set to the current value of the difference[2N−1:0] 58. If the most significant bit (MSB) of the difference between the dividend_tmp[2N−1:0] 42 and the divider_tmp[2N−1:0] 44 is equal to one, the least significant bit (LSB) of the quotient[N−1:0] 38 is set to zero and the dividend_tmp[2N−1:0] 44 remains the same. Under both of the aforementioned conditions, the quotient[N−1:0] 38 is shifted to the left by one on every clock cycle before the LSB of the quotient[N−1:0] 38 is set to either zero or one.

The right shifter 46 receives as input an N-bit quantity (the divider[2N−1:0] 36), and outputs a 2N-bit quantity (the divider_tmp[2N−1:0] 44). Although shown as a single element, the multiplexer 48, in this embodiment, represents a bank of multiplexers that receive as inputs two 2N-bit quantities (dividend_tmp[2N−1:0] 42 and difference[2N−1:0] 58) and output a 2N-bit quantity. Although shown as a single element, the latch 50, in this embodiment, represents a bank of 2N-bit wide latches that receive as input an N-bit quantity (dividend[N−1:0] 34) and a 2N-bit quantity from multiplexer 48, and output a 2N-bit quantity (dividend_tmp[2N−1:0] 42) and an N-bit quantity (remainder[N−1:0] 40). The remainder [N−1:0] 40 represents the least significant N bits of the dividend_tmp[2N−1:0] 42. Similarly, although shown as a single element, the subtractor 52, in this embodiment, represents a bank of subtractors that receive as input two 2N-bit quantities (the divider_tmp[2N−1:0] 44 and dividend_tmp[2N−1:0] 42) and outputs another 2N-bit quantity (difference[2N−1:0] 58).

Figure 3:
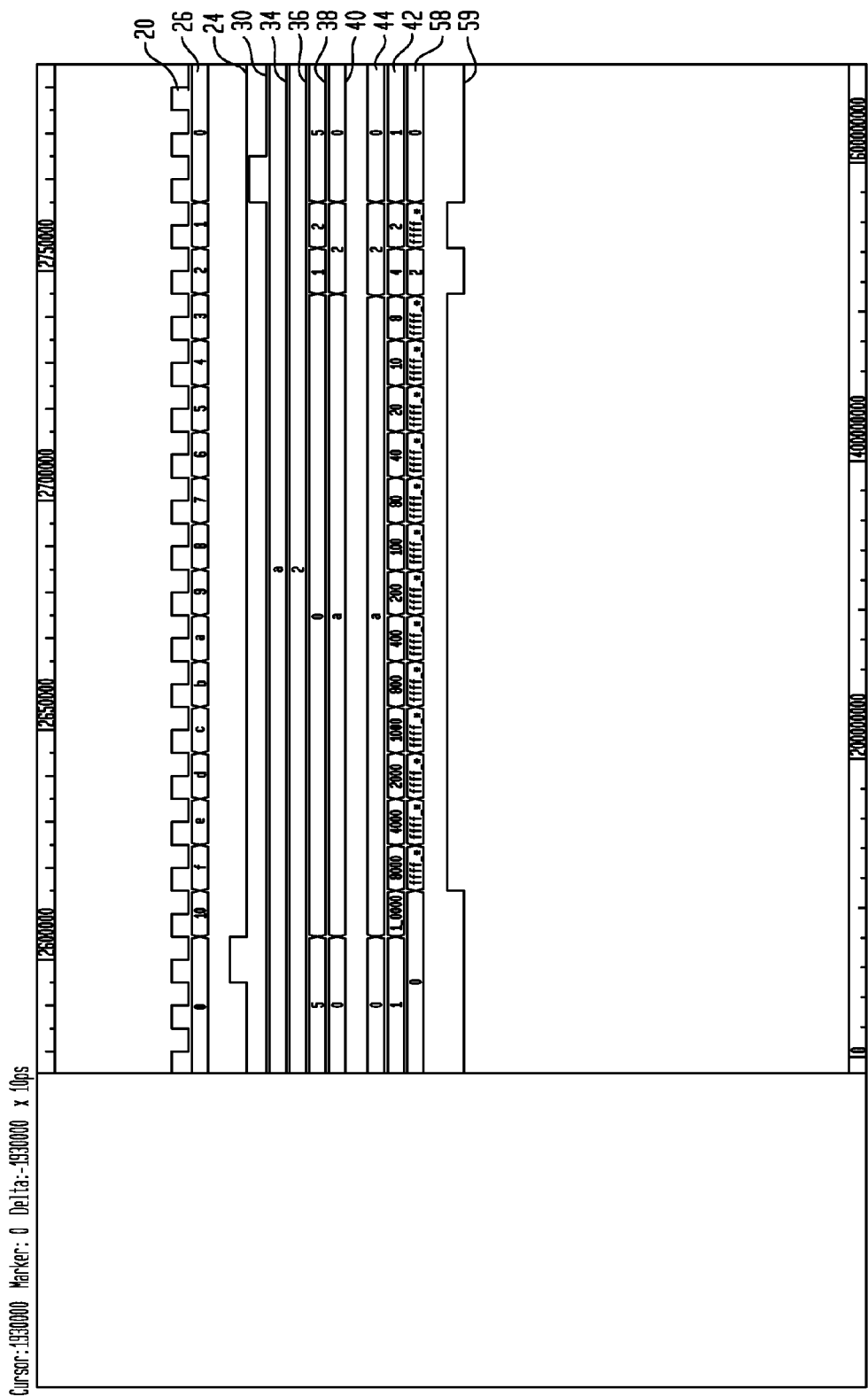
FIG. 3 is a timing diagram showing illustrative signals associated with the digital divider of FIG. 2 during a first division operation.

By way of example only and without loss of generality, FIG. 3 is a timing diagram depicting certain illustrative signals associated with the division logic 12 shown in FIGS. 1 and 2 during a first division operation, in which the dividend is equal to 10 (or 000AH) and the divider is equal to 2 (or 0002H). In response to the start trigger signal 24 being valid or high, the counter 18 is loaded with the parameter B, which is equal to five (5) in this example. This causes the counter 18 to begin counting down from 16 (or 10H) to zero. It is to be appreciated that while reference is made to a count-down arrangement, other embodiments of the invention may similarly employ a count-up arrangement with only slight modification to the circuitry, as will become apparent to those skilled in the art given the teachings herein. Further, it is to be understood that given appropriate changes, which will become apparent to those skilled in the art, in the logic design associated with the embodiments herein, signals, such as but not limited to the start output signal 24, could be implemented as a high signal that is pulled low (active low) rather than a low signal that is pulled high (active high) while remaining within the scope of the disclosure. Similarly, transitions in the logic design could be implemented in response to rising and/or falling edges of the clock signal 20 while remaining within the scope of the disclosure.

During the clock cycles corresponding to the count [B−1:0] 26 being equal to 16 (or 10H) to 3 (or 03H), the division operation processes leading zeros in the most significant bits of the dividend[N−1:0] 34 and divider[N−1:0] 36. During each clock cycle, the difference between the dividend_tmp [2N−1:0] 42 and divider_tmp[2N−1:0] is calculated. Since the MSB of the difference is zero, the dividend_tmp[2N−1:0] 42 remains equal to 0AH while the divider_tmp[2N−1:0] is shifted to the right by one bit.

During the clock cycle corresponding to the count [B−1:0] 26 being equal to 2 (or 02H), the divider_tmp[2N−1:0] 44, which is equal to 2 (or 02H), is subtracted from the dividend_tmp[2N−1:0] 42, which is equal to 10 (or 0AH). Since the result of this subtraction is positive and the LSB of the difference[2N−1:0] 58 is equal to zero, the multiplexer 54 outputs a one as the LSB of the quotient[N−1:0] 38. The divider_tmp[2N−1:0] 44 is also shifted to the right by one in the right shifter 46. Since the LSB of the difference[2N−1:0] 58 is equal to zero, the difference[2N−1:0] 58 is copied to the dividend_tmp[2N−1:0] 42, which is now equal to 2 (or 02H), by operation of the multiplexer 48 and latch 50.

During the clock cycle corresponding to the count [B−1:0] 26 being equal to 1 (or 01H), the divider_tmp[2N−1:0] 44, which is equal to 4 (or 04H), is subtracted from the dividend_tmp[2N−1:0] 42, which is equal to 2 (or 02H). Since the result of this subtraction is negative and the LSB of the difference[2N−1:0] 58 is equal to one, the multiplexer 54 outputs a zero as the LSB of the quotient[N−1:0] 38 after shifting the quotient[N−1:0] 38 left by one in the left shifter 56. The divider_tmp[2N−1:0] 44 is also shifted to the right by one in the right shifter 46. Since the LSB of the difference[2N−1:0] 58 is equal to one, the dividend_tmp[2N−1:0] 42 remains the same by operation of the multiplexer 48 and latch 50.

During the clock cycle corresponding to the count [B−1:0] 26 being equal to 0 (or 00H), the divider_tmp[2N−1:0] 44, which is equal to 2 (or 02H), is subtracted from the dividend_tmp[2N−1:0] 42, which is equal to 2 (or 02H). Since the result of this subtraction is positive and the LSB of the difference[2N−1:0] 58 is equal to zero, the multiplexer 54 outputs a one as the LSB of the quotient[N−1:0] 38 after shifting the quotient[N−1:0] 38 left by one in the left shifter 56. The divider_tmp[2N−1:0] 44 is also shifted to the right by one in the right shifter 46. Since the LSB of the difference[2N−1:0] 58 is equal to zero, the difference[2N−1:0] is also copied to the dividend_tmp[2N−1:0] 42, which is now equal to 0 (or 00H), by operation of the multiplexer 48 and latch 50. Thus, the quotient[N−1:0] 38 is equal to 5 (or 05H) and the remainder[N−1:0] 40 is equal to 0 (or 00H).

Figure 4:
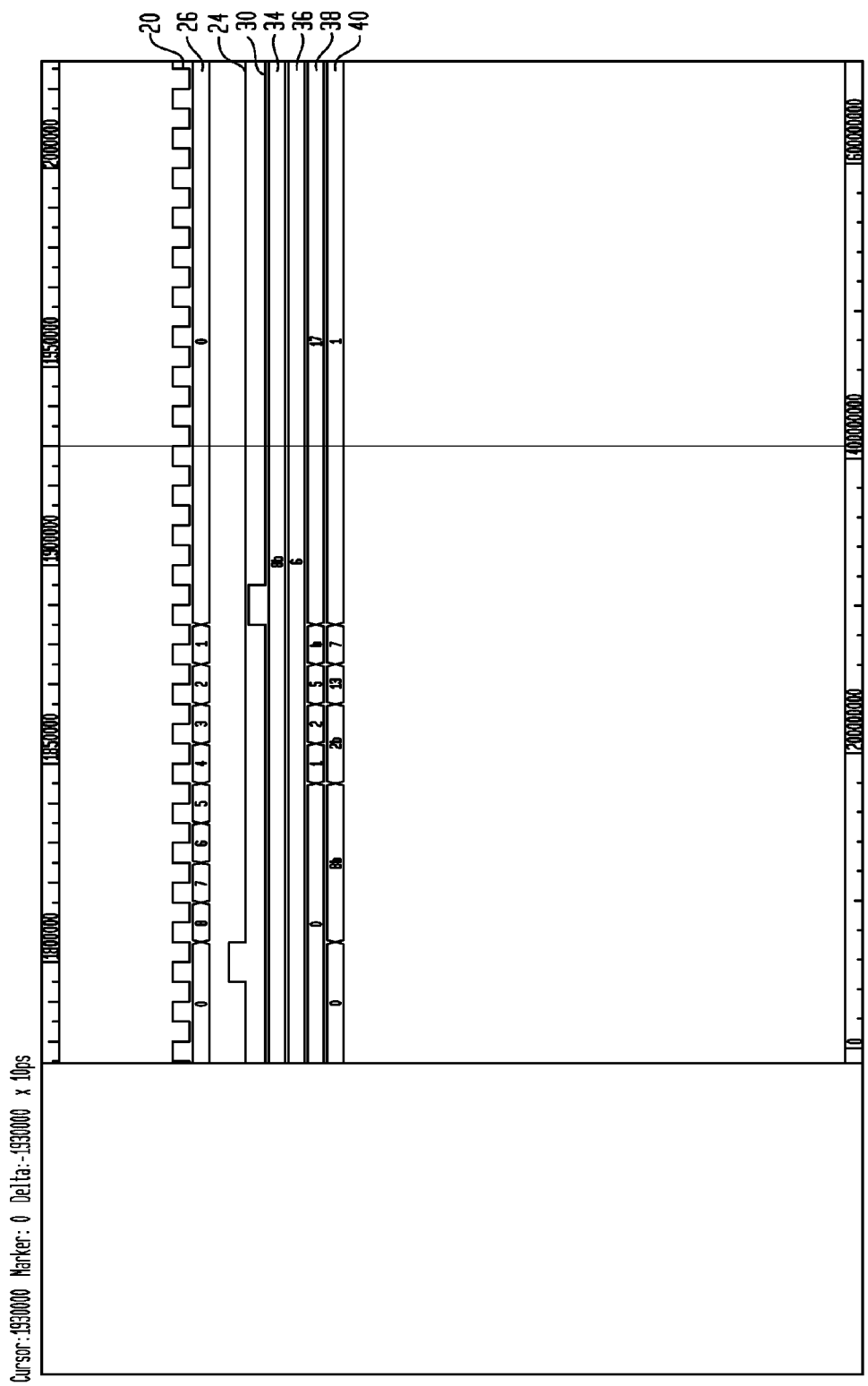
FIG. 4 is a timing diagram showing illustrative signals associated with the digital divider in FIG. 2 during a second division operation.

FIG. 4 is a timing diagram depicting certain illustrative signals associated with the division logic 12 shown in FIGS. 1 and 2 during a second division operation, in which the dividend is equal to 139 (or 008BH) and the divider is equal to 6 (or 0006H). In this example, the parameter B is equal to 4 (four) and the counter 18 counts down from 8 (or 08H) to zero.

Figure 5:
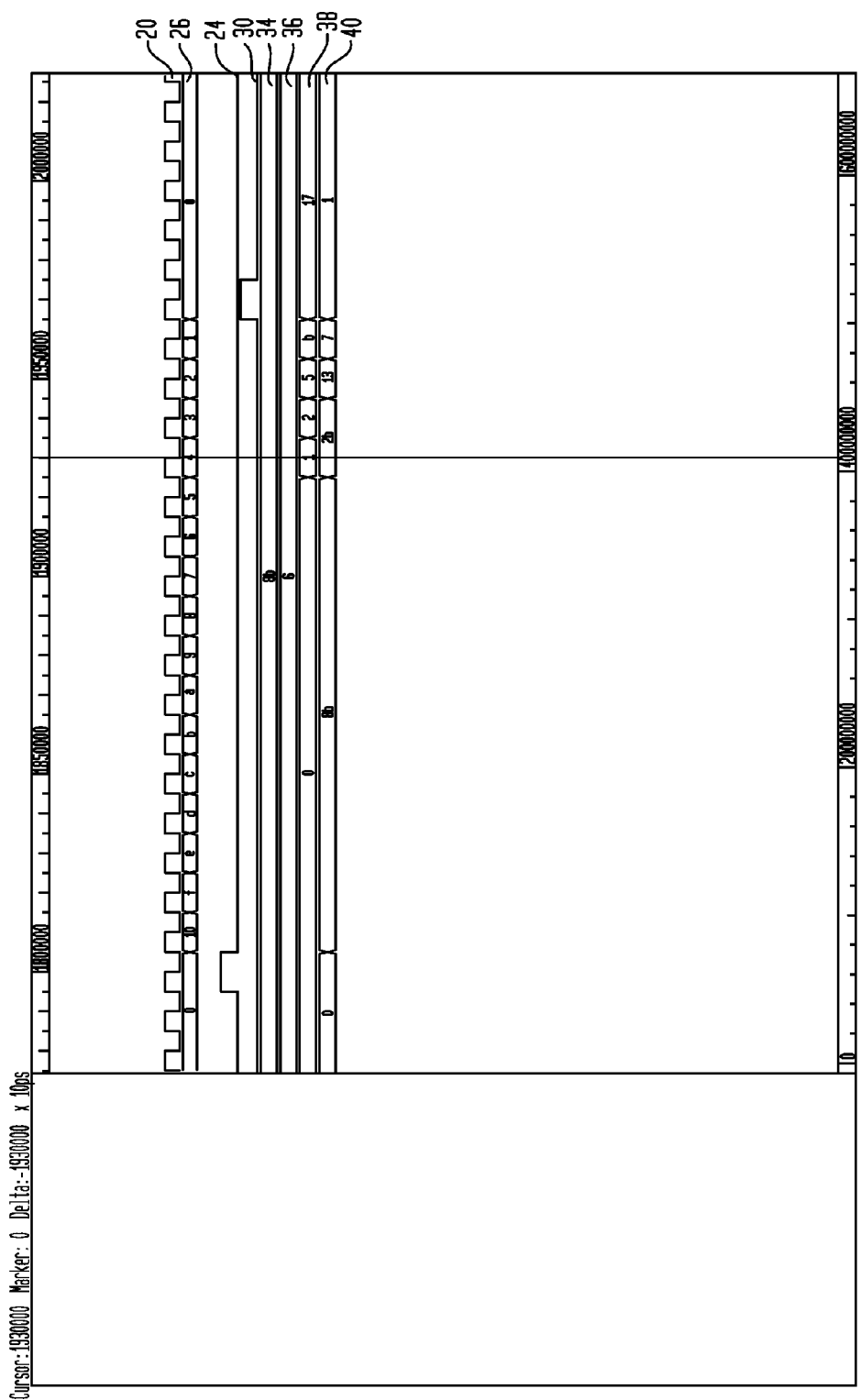
FIG. 5 is a timing diagram showing illustrative signals associated with the digital divider in FIG. 2 during a third division operation.

FIG. 5 is a timing diagram depicting certain illustrative signals associated with the division logic 12 shown in FIGS. 1 and 2 during a third division operation, in which the dividend is equal to 139 (or 008BH), the divider is equal to 6 (or 0006H). In this example, the parameter B is equal to 5 (five) and the counter 18 counts down from 16 (or 10H) to zero.

In addition to the features discussed above, embodiments of the invention incorporate and can be used in conjunction with any or all of the following while remaining within the intended scope:

implementation of the embodiments utilizing any technology, device, module, and/or system;

configuration of the embodiments with a counter, count, dividend, divisor, quotient, and/or remainder of any bit-width;

implementation of the embodiments utilizing pipelining and/or combinatorial logic; and steps of the embodiments are capable of being performed in any order.

Figure 6:
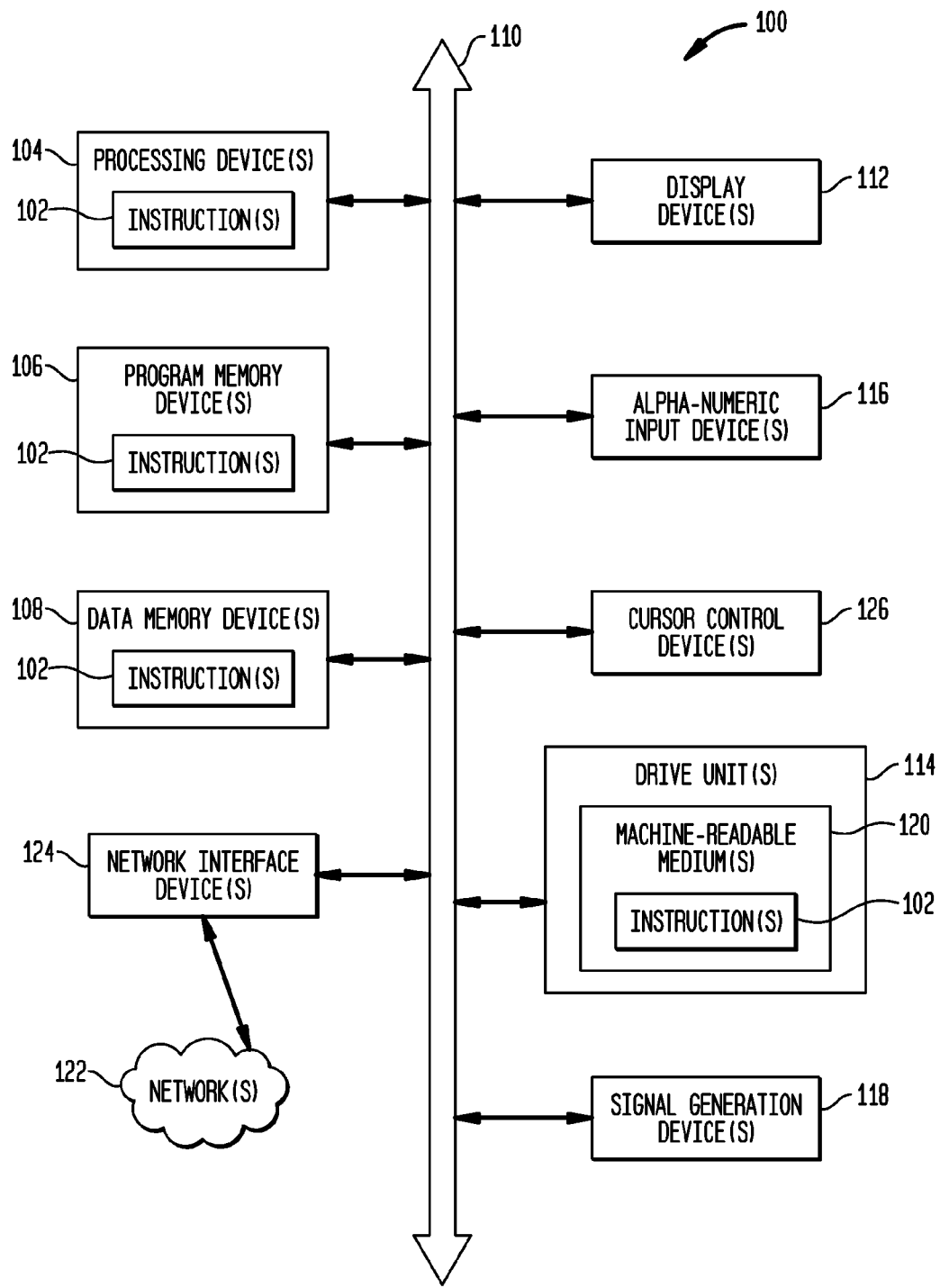
FIG. 6 is a block diagram depicting at least a portion of an exemplary machine in the form of a computing system configured to perform the disclosed methods, according to an embodiment of the invention.

FIG. 6 is a block diagram depicting at least a portion of an exemplary machine in the form of a computing system 100 configured to perform the disclosed methods, according to an embodiment of the invention. The computing system 100 includes a set of instructions 102 that, when executed, causes the system to perform any one or more of the methodologies according to embodiments of the invention. In some embodiments, the computing system 100 operates as a standalone device. In some embodiments, the computing system 100 is coupled (e.g., using a network) with other systems and/or devices. In a networked implementation, the system 100 operates in the capacity of a server or a client user machine in a server-client user network environment. The computing system 100 may comprise, for example, one or more of a server computer, a client user computer, a personal computer (PC), a tablet PC, a Personal Digital Assistant (PDA), a cellular telephone, a mobile device, a palmtop computer, a laptop computer, a desktop computer, a communication device, a personal trusted device, a web appliance, a network router, a switch or bridge, or any apparatus capable of executing a set of instructions (sequential or otherwise) that specify actions to be taken by that apparatus.

The computing system 100 includes a processing device(s) 104 (e.g., a central processing unit (CPU), a graphics processing unit (GPU), or both), program memory device(s) 106, and data memory device(s) 108, which communicate with each other via a bus 110. The computing system 100 further includes display device(s) 112 (e.g., liquid crystal display (LCD), a flat panel, a solid state display, or a cathode ray tube (CRT)). The computing system 100 includes input device(s) 116 (e.g., a keyboard), cursor control device(s) 112 (e.g., a mouse), disk drive unit(s) 114, signal generation device(s) 118 (e.g., a speaker or remote control), and network interface device(s) 120.

The disk drive unit(s) 114 includes machine-readable medium(s) 120, on which is stored one or more sets of instructions 102 (e.g., software) embodying any one or more of the methodologies or functions disclosed herein, including those methods disclosed herein. The instructions 102 also resides, completely or at least partially, within the program memory device(s) 106, the data memory device(s) 108, and/or within the processing device(s) 104 during execution thereof by the computing system 100. The program memory device(s) 106 and the processing device(s) 104 also constitute machine-readable media. Dedicated hardware implementations 104, such as but not limited to application specific integrated circuits, programmable logic arrays, and other hardware devices can likewise be constructed to implement the methods described herein. Applications that include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments, the methods, functions or logic described herein are implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods, functions or logic described herein.

The present embodiment contemplates a machine-readable medium or computer-readable medium containing instructions 102, or that which receives and executes instructions 102 from a propagated signal so that a device coupled with a network environment 122 can send or receive voice, video or data, and to communicate over the network 122 using the instructions 102. The instructions 102 are transmitted or received over a network 122 via the network interface device(s) 120. The machine-readable medium also contains a data structure for storing data useful in providing a functional relationship between the data and a machine or computer in an illustrative embodiment of the disclosed systems and methods.

While the machine-readable medium 120 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the present embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

It should also be noted that software which implements the disclosed methods, functions or logic are stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein are stored.

Although the present specification describes components and functions implemented in the embodiments with reference to particular standards and protocols, the disclosed embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments are utilized and derived therefrom, such that structural and logical substitutions and changes are made without departing from the scope of this disclosure. Figures are also merely representational and are not drawn to scale. Certain proportions thereof are exaggerated, while others are reduced. Accordingly, the specification and drawings are to be regarded in an illustrative rather than a restrictive sense.

Such embodiments of the inventive subject matter are referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose is substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

The Abstract is provided to comply with 37 C.F.R. §1.72 (b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as separately claimed subject matter.

Although specific example embodiments have been described, it will be evident that various modifications and changes are made to these embodiments without departing from the broader scope of the inventive subject matter described herein. Accordingly, the specification and drawings are to be regarded in an illustrative rather than in a restrictive sense. The accompanying drawings that form a part hereof, show by way of illustration, and without limitation, specific embodiments in which the subject matter is practiced. The embodiments illustrated are described in sufficient detail to enable those skilled in the art to practice the teachings disclosed herein. Other embodiments are utilized and derived therefrom, such that structural and logical substitutions and changes are made without departing from the scope of this disclosure. This Detailed Description, therefore, is not to be taken in a limiting sense, and the scope of various embodiments is defined only by the appended claims, along with the full range of equivalents to which such claims are entitled.

Given the teachings of the invention provided herein, one of ordinary skill in the art will be able to contemplate other implementations and applications of the techniques of the invention. Although illustrative embodiments of the invention have been described herein with reference to the accompanying drawings, it is to be understood that the invention is not limited to those precise embodiments, and that various other changes and modifications are made by one skilled in the art without departing from the scope of the appended claims.

What is claimed is:

1. A method of performing digital division, the method comprising:
   right-shifting, by a right-shift circuit during a clock cycle, a divider to provide a temporary divider;
   determining, by a determination circuit and during the clock cycle, a temporary dividend based on at least one of a dividend and a difference between the divider and the dividend;
   subtracting, by a subtraction circuit, the temporary divider from the temporary dividend to provide an updated difference for the clock cycle; and
   left-shifting, by a left-shift circuit, a quotient based on the updated difference for the clock cycle.

2. The method, as defined by claim 1, further comprising providing a remainder based on at least one of the dividend and the updated difference for the clock cycle.

3. The method, as defined by claim 1, wherein the dividend comprises a configurable bit-width.

4. The method, as defined by claim 1, wherein the divider comprises a configurable bit-width.

5. The method, as defined by claim 1, further comprising setting a least significant bit of the quotient equal to one in response to a most significant bit of the updated difference being equal to zero.

6. The method, as defined by claim 1, further comprising setting the temporary dividend equal to the updated difference for the clock cycle in response to a most significant bit of the updated difference being equal to zero.

7. The method, as defined by claim 1, further comprising setting a least significant bit of the quotient equal to zero in response to a most significant bit of the updated difference for the clock cycle being equal to one.

8. The method, as defined by claim 1, further comprising maintaining the temporary dividend unchanged in response to a most significant bit of the updated difference for the clock cycle being equal to one.

9. The method, as defined by claim 1, further comprising shifting the quotient to the left in response to a clock signal.

10. The method, as defined by claim 1, further comprising synchronizing at least one of the steps of right-shifting, determining the temporary dividend, and left-shifting using a clock signal.

11. A non-transitory computer-readable medium comprising instructions that, when executed by a processing device, cause the processing device to perform a method of performing digital division, the method comprising:
    right-shifting, by a right-shift circuit during a clock cycle, a divider to provide a temporary divider;
    determining, by a determination circuit and during the clock cycle, a temporary dividend based on at least one of a dividend and a difference between the divider and the dividend;
    subtracting, by a subtraction circuit, the temporary divider from the temporary dividend to provide an updated difference for the clock cycle; and
    left-shifting, by a left-shift circuit, a quotient based on the updated difference for the clock cycle.

12. A digital divider, comprising:
    a right-shift circuit, the right-shift circuit providing a temporary divider during a clock cycle based on a divider;
    a determination circuit, the determination circuit providing the temporary dividend during the clock cycle based on at least one of a dividend and a difference between the divider and the dividend;
    a subtraction circuit, the subtraction circuit subtracting the temporary divider from the temporary dividend to provide an updated difference for the clock cycle; and
    a left-shift circuit, the left-shift circuit providing a quotient based on the updated difference for the clock cycle.

13. The digital divider, as defined by claim 12, wherein the determination circuit provides a remainder based on at least one of the dividend and the updated difference for the clock cycle.

14. The digital divider, as defined by claim 12, wherein the digital divider is configured to accept the dividend with a configurable bit-width.

15. The digital divider, as defined by claim 12, wherein the digital divider is configured to accept the divider with a configurable bit-width.

16. The digital divider, as defined by claim 12, wherein the left-shift circuit sets a least significant bit of the quotient equal to one in response to a most significant bit of the updated difference for the clock cycle being equal to zero.

17. The digital divider, as defined by claim 12, wherein the determination circuit sets the temporary dividend equal to the updated difference in response to a most significant bit of the updated difference for the clock cycle being equal to zero.

18. The digital divider, as defined by claim 12, wherein the left-shift circuit sets a least significant bit of the quotient equal to zero in response to a most significant bit of the updated difference for the clock cycle being equal to one.

19. The digital divider, as defined by claim 12, wherein the temporary dividend remains unchanged in response to a most significant bit of the updated difference for the clock cycle being equal to one.

20. The digital divider, as defined by claim 12, wherein the left-shift circuit shifts the quotient to the left in response to a clock signal.

21. The digital divider, as defined by claim 12, wherein at least one of the right-shift circuit, determination circuit, and left-shift circuit is synchronous.

22. A system to perform digital division, the system comprising:

a counter, the counter providing a count; and
a division circuit, the division circuit being operatively coupled to the counter, the division circuit dividing a dividend by a divider during a clock cycle to provide a quotient for the clock cycle in response to the counter, at least one of the counter and division circuit being configured to accept at least one of the count, dividend, divider, and quotient with a configurable bit-width.

23. The system as defined by claim 22, further comprising a start circuit, the start circuit being operatively coupled to at least one of the counter and the division circuit, the start circuit initiating the digital division in response to receiving a start signal.

24. The system as defined by claim 22, further comprising a stop circuit, the stop circuit being operatively coupled to at least one of the counter and division circuit, the stop circuit providing a valid signal, the valid signal indicating that the quotient is valid.

25. The system as defined by claim 22, wherein a quantity of bits associated with the count is represented by a parameter B, a quantity of bits associated with at least one of the dividend, divider, and quotient is represented by N, a minimum value of B being equal to log 2(N+1) rounded up to a nearest positive integer, B and N being positive integers.

* * * * *